US012767590B2

(12) United States Patent
Hosokawa et al.

(10) Patent No.: US 12,767,590 B2
(45) Date of Patent: Oct. 20, 2026

(54) GLASS COMPOSITION FOR GLASS FIBER, GLASS FIBER, GLASS FIBER WOVEN FABRIC, AND GLASS-FIBER-REINFORCED RESIN COMPOSITION

(71) Applicant: NITTO BOSEKI CO., LTD., Fukushima (JP)

(72) Inventors: Takanobu Hosokawa, Fukushima (JP); Tadashi Kurita, Fukushima (JP); Takashi Nonaka, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 775 days.

(21) Appl. No.: 18/030,788

(22) PCT Filed: Feb. 9, 2022

(86) PCT No.: PCT/JP2022/005136

§ 371 (c)(1),
(2) Date: Apr. 7, 2023

(87) PCT Pub. No.: WO2022/181340

PCT Pub. Date: Sep. 1, 2022

(65) Prior Publication Data

US 2023/0373849 A1 Nov. 23, 2023

(30) Foreign Application Priority Data

Feb. 24, 2021 (JP) ................................ 2021-026996

(51) Int. Cl.

| | |
|---|---|
| ***C03C 13/00*** | (2006.01) |
| ***C03C 3/118*** | (2006.01) |
| ***C08J 5/04*** | (2006.01) |
| ***D03D 15/267*** | (2021.01) |
| *B29B 11/16* | (2006.01) |
| *B29K 309/08* | (2006.01) |
| *C03C 25/1095* | (2018.01) |

(52) U.S. Cl.

CPC .............. *C03C 13/00* (2013.01); *C03C 3/118* (2013.01); *C08J 5/043* (2013.01); *D03D 15/267* (2021.01); *B29B 11/16* (2013.01); *B29K 2309/08* (2013.01); *C03C 25/1095* (2013.01); *C03C 2213/00* (2013.01); *D10B 2505/02* (2013.01)

(58) Field of Classification Search

CPC . C03C 133/00; C03C 25/109; C03C 2213/00; D10B 2505/02; D03D 15/267; C08J 5/043; B29B 11/16; B29K 2309/08
USPC .......................................................... 524/492
See application file for complete search history.

(56) References Cited

U.S. PATENT DOCUMENTS

| | | | |
|---|---|---|---|
| 5,958,808 | A | 9/1999 | Mori et al. |
| 2004/0175557 | A1 | 9/2004 | Creux et al. |
| 2019/0337839 | A1 | 11/2019 | Hausrath et al. |
| 2020/0181004 | A1 | 6/2020 | Hausrath et al. |
| 2020/0199015 | A1 | 6/2020 | Hosokawa et al. |
| 2020/0216351 | A1 | 7/2020 | Hausrath et al. |

FOREIGN PATENT DOCUMENTS

| | | | |
|---|---|---|---|
| CN | 101269915 | A | 9/2008 |
| JP | H08-333137 | A | 12/1996 |
| JP | 2004-107112 | A | 4/2004 |
| JP | 2004-525066 | A | 8/2004 |
| JP | 6468409 | B1 | 2/2019 |

OTHER PUBLICATIONS

Office Action/Search Report dated May 31, 2025 issued in the corresponding Chinese Patent Application No. 202280008408.6 with the English machine translation thereof.

*Primary Examiner* — Ruiyun Zhang
(74) *Attorney, Agent, or Firm* — Carrier, Shende & Associates P.C.; Fulchand P. Shende; Joseph P. Carrier

(57) ABSTRACT

A glass composition for glass fiber includes 50.00 to 61.00% by mass of $SiO_2$, 16.00 to 27.00% by mass of $B_2O_3$, 7.00 to 14.00% by mass of $Al_2O_3$, 0.20 to 4.00% by mass of $P_2O_5$, 0.50 to 5.00% by mass of $TiO_2$, 0.10 to 5.00% by mass of CaO, 0 to 4.00% by mass of MgO, and 0 to 2.00% by mass of $F_2$ and $Cl_2$ in total, with respect to the total amount of the glass composition for glass fiber, and the content S of $SiO_2$, the content A of $Al_2O_3$, the content P of $P_2O_5$, the content T of $TiO_2$, the content C of CaO, and the content M of MgO satisfy the following formula (1):

$$3.65 \leq (S/A)^2 \times (P \times T)^{1/2}/(C+M)^3 \leq 8.25 \quad (1).$$

8 Claims, No Drawings

GLASS COMPOSITION FOR GLASS FIBER, GLASS FIBER, GLASS FIBER WOVEN FABRIC, AND GLASS-FIBER-REINFORCED RESIN COMPOSITION

TECHNICAL FIELD

The present invention relates to a glass composition for glass fiber, glass fiber, a glass fiber woven fabric, and a glass fiber-reinforced resin composition.

BACKGROUND ART

Glass fiber is manufactured by melting a glass raw material prepared so as to be a glass composition for glass fiber having a desired composition in a glass melting furnace to form molten glass (a melt of the glass composition for glass fiber); discharging the molten glass from a container (bushing) having a nozzle plate on which several to thousands of nozzle tips are formed; and cooling the discharged molten glass while stretching by winding at a high speed to solidify it into fiber (hereinafter, this operation is sometimes referred to as "spinning"). The above bushing is formed from a noble metal such as platinum.

Conventionally, glass fiber has been widely used in various applications to improve the strength of resin molded products, and the resin molded products have been used for a housing or a part of electronic devices such as a server, a smartphone, a laptop computer, and the like.

In general, glass absorbs energy from alternating current as heat, and thus has a problem that the above resin molded product generates heat when the resin molded product is used for a housing or a part of the electronic devices.

The dielectric loss energy absorbed by glass is proportional to the dielectric constant and the dielectric loss tangent determined by the component and the structure of the glass, and is represented by the following formula (A):

$$W = kfv^2 \times \varepsilon^{1/2} \times \tan\delta \qquad (A).$$

wherein W is a dielectric loss energy, k is a constant, f is a frequency, $v^2$ is a potential gradient, E is a dielectric constant, and tan δ is a dielectric loss tangent. From formula (A), it is found that the dielectric loss is larger and heat generation of the above resin molded product is larger as the dielectric constant and the dielectric loss tangent are larger and as the frequency is higher.

In recent years, in response to the fact that the frequency (f in the above formula (A)) of the alternating current used in the above electronic devices has increased, the glass fiber used for a housing or a part of the above electronic device has been required to have a lower dielectric constant and a lower dielectric loss tangent in order to reduce dielectric loss energy. In particular, the glass fiber has been required to have a low dielectric loss tangent because the dielectric loss tangent has larger influence on the formula (A) than that of the dielectric constant, which is raised to the power of ½.

In view of the above situation, the present applicant has suggested, as a glass composition for glass fiber having a low dielectric constant and a low dielectric loss tangent, suppressing the occurrence of phase separation, and having a reduced viscosity at high temperatures, a glass composition for glass fiber including $SiO_2$ in the range of 52.0 to 59.5% by mass, $B_2O_3$ in the range of 17.5 to 25.5% by mass, $Al_2O_3$ in the range of 9.0 to 14.0% by mass, SrO in the range of 0.5 to 6.0% by mass, MgO in the range of 1.0 to 5.0% by mass, CaO in the range of 1.0 to 5.0% by mass, and $F_2$ and $Cl_2$ in the range of 0.1 to 2.5% by mass in total, with respect to the total amount of the glass composition for glass fiber (see Patent Literature 1).

CITATION LIST

Patent Literature

Patent Literature 1: Japanese Patent No. 6468409

SUMMARY OF INVENTION

Technical Problem

Meanwhile, there has been required a glass composition for glass fiber that enables glass fiber having a lower dielectric constant and a lower dielectric loss tangent particularly in a high-frequency region of about 10 GHz to be obtained therefrom. In order to achieve such an issue, it is contemplated that, in a glass composition for glass fiber, the contents of $Al_2O_3$ and alkaline earth metal oxides (CaO, MgO, and SrO) are lowered and correspondingly, the contents of $SiO_2$ and $B_2O_3$ are raised, with respect to the total amount of the glass composition for glass fiber.

However, when the content of $SiO_2$ with respect to the total amount of the glass composition for glass fiber becomes higher in the glass composition for glass fiber, the 1000 poise temperature increases, the viscosity of the glass also increases, and thus the composition becomes difficult to mix. For this reason, it is difficult to homogeneously melt the glass, and degradation in the bushing on spinning is greatly accelerated, which is a problem.

In order to solve the problem, it is contemplated to partially replace the content of $SiO_2$ with respect to the total amount of the glass composition for glass fiber with $P_2O_5$ in the glass composition for glass fiber to thereby lower the 1000 poise temperature while maintaining excellent dielectric characteristics (a low dielectric constant and a low dielectric loss tangent) in a high-frequency region.

However, when the content of $SiO_2$ with respect to the total amount of the glass composition for glass fiber is partially replaced with $P_2O_5$ in the glass composition for glass fiber, disadvantageously, the water resistance of the glass fiber deteriorates, and foreign matter precipitated on the glass fiber surface due to hydrolysis of the glass causes the dielectric characteristics to deteriorate or the strength of the glass fiber to markedly decrease.

An object of the present invention is, by eliminating the disadvantage, to provide a glass composition for glass fiber that enables glass fiber having excellent water resistance and excellent dielectric characteristics in a high-frequency region to be obtained therefrom, the glass composition for glass fiber per se having a lowered 1000 poise temperature.

Solution to Problem

In order to achieve the object, the glass composition for glass fiber of the present invention includes $SiO_2$ in a range of 50.00 to 61.00% by mass, $B_2O_3$ in a range of 16.00 to 27.00% by mass, $Al_2O_3$ in a range of 7.00 to 14.00% by mass, $P_2O_5$ in a range of 0.20 to 4.00% by mass, $TiO_2$ in a range of 0.50 to 5.00% by mass, CaO in a range of 0.10 to 5.00% by mass, MgO in a range of 0 to 4.00% by mass, and $F_2$ and $Cl_2$ in a range of 0 to 2.00% by mass in total, with respect to the total amount of the glass composition for glass fiber, and the content S (% by mass) of $SiO_2$, the content A (% by mass) of $Al_2O_3$, the content P (% by mass) of $P_2O_5$, the content T (% by mass) of $TiO_2$, the content C (% by mass) of CaO, and the content M (% by mass) of MgO satisfy the following formula (1):

$$3.65 \leq (S/A)^2 \times (P \times T)^{1/2}/(C+M)^3 \leq 8.25 \quad (1).$$

When the glass composition for glass fiber of the present invention includes $SiO_2$, $B_2O_3$, $Al_2O_3$, $P_2O_5$, $TiO_2$, CaO, MgO, and $F_2$ and $Cl_2$ in the above range, and the content S (% by mass) of $SiO_2$, the content A (% by mass) of $Al_2O_3$, the content P (% by mass) of $P_2O_5$, the content T (% by mass) of $TiO_2$, the content C (% by mass) of CaO, and the content M (% by mass) of MgO satisfy the formula (1), glass fiber having excellent water resistance and excellent dielectric characteristics, that is, a low dielectric constant and a low dielectric loss tangent, in a high-frequency region can be obtained, and the glass composition per se can have a lowered 1000 poise temperature.

Here, glass fiber obtained from the glass composition for glass fiber of the present invention having a low dielectric constant means that the dielectric constant is 4.1 or less at a measurement frequency of 10 GHz, and having a low dielectric loss tangent means that the dielectric loss tangent is 0.0011 or less at a measurement frequency of 10 GHz.

Glass fiber obtained from the glass composition for glass fiber of the present invention exhibiting excellent water resistance means that, upon evaluation of the water resistance by the following evaluation method, the mass reduction rate is 2.0% or less and the components of the glass fiber are not substantially eluted even in water.

In the method for evaluating the water resistance, first, a glass batch, obtained by mixing glass raw materials so as to have a predetermined glass composition for glass fiber, is placed in an 80 mm diameter platinum crucible, melted by heating at a temperature of 1550° C. for 4 hours and then at a temperature of 1650° C. for 2 hours. Next, homogeneous glass cullet obtained, which is taken out from the crucible, is placed in a small cylindrical platinum bushing having a circular nozzle tip at the bottom thereof, and the bushing is heated to a predetermined temperature to melt the glass cullet. Thereafter, the molten glass discharged through the nozzle tip is cooled and solidified while stretched by winding on a stainless collet at a predetermined speed to thereby obtain glass fiber comprising a perfect circular section and a fiber diameter of 13 μm. Next, about 1 g of the obtained glass fiber (glass fiber for test) is collected from the collet and dried at a temperature of 120° C. for an hour, and the mass (mass before operation) is measured. Subsequently, the glass fiber for test is allowed to stand in 100 ml of distilled water at a temperature of 80° C. for 24 hours. Then, the glass fiber for test is taken on metal mesh perforated with eyes of about 150 μm, washed with distilled water, then dried at a temperature of 120° C. for an hour, and the mass (mass after operation) is measured. Then, the mass reduction rate (100×(1−(mass after operation/mass before operation))) is calculated from the mass before operation and mass after operation.

The glass composition for glass fiber of the present invention having a lowered 1000 poise temperature means that the 1000 poise temperature is 1500° C. or less.

In the glass composition for glass fiber of the present invention, the S, A, P, T, C, and M preferably satisfy the following formula (2), more preferably satisfy the following formula (3), and still more preferably satisfy the following formula (4):

$$4.51 \leq (S/A)^2 \times (P \times T)^{1/2}/(C+M)^3 \leq 7.32 \quad (2);$$

$$4.87 \leq (S/A)^2 \times (P \times T)^{1/2}/(C+M)^3 \leq 7.20 \quad (3);$$

$$5.96 \leq (S/A)^2 \times (P \times T)^{1/2}/(C+M)^3 \leq 7.16 \quad (4).$$

The present invention also consists in glass fiber formed from any of the glass compositions for glass fiber. The present invention also consists in a glass fiber woven fabric including the glass fiber. Further, the present invention also consists in a glass fiber-reinforced resin composition including the glass fiber.

The glass fiber of the present invention can be obtained by, for example, melting the above glass composition for glass fiber of the present invention, discharging the obtained melt from a bushing having a nozzle plate with 1 to 8000 nozzle tips or holes formed therein, and cooling the melt while stretching by winding at a high speed to solidify it into a fiber. Accordingly, the glass fiber of the present invention comprises the glass composition identical to that of the above glass composition for glass fiber of the present invention.

DESCRIPTION OF EMBODIMENTS

Hereinafter, embodiments of the present invention will be described in detail.

The glass composition for glass fiber of the present embodiment includes $SiO_2$ in the range of 50.00 to 61.00% by mass, $B_2O_3$ in the range of 16.00 to 27.00% by mass, $Al_2O_3$ in the range of 7.00 to 14.00% by mass, $P_2O_5$ in the range of 0.20 to 4.00% by mass, $TiO_2$ in the range of 0.50 to 5.00% by mass, CaO in the range of 0.10 to 5.00% by mass, MgO in the range of 0 to 4.00% by mass, and $F_2$ and $Cl_2$ in the range of 0 to 2.00% by mass in total, with respect to the total amount of the glass composition for glass fiber, and the content S (% by mass) of $SiO_2$, the content A (% by mass) of $Al_2O_3$, the content P (% by mass) of $P_2O_5$, the content T (% by mass) of $TiO_2$, the content C (% by mass) of CaO, and the content M (% by mass) of MgO satisfy the following formula (1):

$$3.65 \leq (S/A)^2 \times (P \times T)^{1/2}/(C+M)^3 \leq 8.25 \quad (1).$$

When the glass composition for glass fiber of the present embodiment includes $SiO_2$, $B_2O_3$, $Al_2O_3$, $P_2O_5$, $TiO_2$, CaO, MgO, and $F_2$ and $Cl_2$ in the above range, and the content S (% by mass) of $SiO_2$, the content A (% by mass) of $Al_2O_3$, the content P (% by mass) of $P_2O_5$, the content T (% by mass) of $TiO_2$, the content C (% by mass) of CaO, and the content M (% by mass) of MgO satisfy the formula (1), glass fiber having excellent water resistance and excellent dielectric characteristics, that is, a low dielectric constant of 4.1 or less and a low dielectric loss tangent of 0.0011 or less, in a high-frequency region at a measurement frequency of 10 GHz can be obtained, and the glass composition per se can have a lowered 1000 poise temperature of less than 1500° C.

Here, in the formula (1), "S/A" is a ratio of the content of $SiO_2$ to the content of $Al_2O_3$. This value becoming smaller means that the content of $Al_2O_3$ relatively increases, and in such a case, the dielectric characteristics of the glass fiber tend to deteriorate. On the other hand, "S/A" becoming larger means that the content of $SiO_2$ relatively increases, and in such a case, the relative increase contributes to the dielectric characteristics of the glass fiber, but the 1000 poise temperature of the glass composition for glass fiber tends to increase.

"P×T" is the product of $P_2O_5$ and $TiO_2$, which are intermediate oxides. As this value becomes larger, such a larger value contributes to the dielectric characteristics of the glass fiber, but the water resistance of the glass fiber tends to deteriorate. On the other hand, as "P×T" becomes smaller, the viscosity of the molten glass increases, and the 1000 poise temperature of the glass composition for glass fiber tends to increase.

"C+M" is the total content of CaO and MgO, which are alkaline earth metal oxides greatly affecting the dielectric characteristics of the glass fiber. As this value becomes larger, the dielectric characteristics of the glass fiber tends to deteriorate. On the other hand, as "C+M" becomes smaller, the 1000 poise temperature of the glass composition for glass fiber tends to increase.

Accordingly, the formula (1) is presumed to integrate these tendencies to represent the balance among the dielectric characteristics of the glass fiber, the water resistance of the glass fiber, and the 1000 poise temperature of the glass composition for glass fiber.

When the glass composition for glass fiber of the present embodiment has a content of $SiO_2$ of less than 50.00% by mass with respect to the total amount of the glass composition for glass fiber, the mechanical strength of the glass fiber obtained from the glass composition for glass fiber is greatly reduced, and the function of the glass fiber as a reinforcing material in the glass fiber-reinforced resin composition is impaired. In addition, the glass fiber tends to deteriorate when placed in an acidic environment. On the other hand, when the content of $SiO_2$ is more than 61.00% by mass with respect to the total amount of the glass composition for glass fiber, the viscosity at high temperatures increases. Thus, the temperature at which the glass raw material is melted rises, and from the viewpoint of production cost, the glass composition for glass fiber of the present embodiment will be not suitable for industrial glass fiber production.

The glass composition for glass fiber of the present embodiment has a content of $SiO_2$ with respect to the total amount of the glass composition for glass fiber preferably in the range of 52.10 to 59.90% by mass, more preferably in the range of 54.10 to 59.70% by mass, still more preferably in the range of 56.10 to 59.60% by mass, particularly preferably in the range of 57.60 to 59.50% by mass, and most preferably in the range of 58.10 to 59.40% by mass.

When the glass composition for glass fiber of the present embodiment has a content of $B_2O_3$ of less than 16.00% by mass with respect to the total amount of the glass composition for glass fiber, the dielectric loss tangent of the glass fiber obtained from the glass composition for glass fiber cannot be sufficiently reduced. On the other hand, when the content of $B_2O_3$ is more than 27.00% by mass with respect to the total amount of the glass composition for glass fiber, phase separation occurs in the glass fiber obtained from the glass composition for glass fiber, and the chemical durability of the glass fiber may decrease.

The glass composition for glass fiber of the present embodiment has a content of $B_2O_3$ with respect to the total amount of the glass composition for glass fiber of preferably in the range of 19.60 to 24.90% by mass, more preferably in the range of 20.10 to 24.50% by mass, still more preferably in the range of 20.60 to 24.00% by mass, particularly preferably in the range of 21.10 to 23.50% by mass, and most preferably in the range of 21.50 to 23.00% by mass.

When the glass composition for glass fiber of the present embodiment has a content of $B_2O_3$ of 19.60% by mass or more with respect to the total amount of the glass composition for glass fiber, the viscosity of molten glass obtained from the glass composition for glass fiber is kept low, the production cost is reduced, and thus the glass composition will be more suitable for industrial glass fiber production.

When the glass composition for glass fiber of the present embodiment has a content of $B_2O_3$ of 24.90% by mass or less with respect to the total amount of the glass composition for glass fiber, volatile components can be reduced on manufacturing glass fiber via molten glass from the glass composition for glass fiber. The glass composition also reduces wear of the furnace body of a glass melting furnace for melting the glass composition for glass fiber to thereby lengthen the life of the furnace body, enabling the production cost to be reduced.

When the glass composition for glass fiber of the present embodiment has a content of $Al_2O_3$ of less than 7.00% by mass with respect to the total amount of the glass composition for glass fiber, phase separation occurs in the glass fiber obtained from the glass composition for glass fiber, and the chemical durability of the glass fiber may decrease. On the other hand, when the content of $Al_2O_3$ is more than 14.00% by mass with respect to the total amount of the glass composition for glass fiber, the dielectric loss tangent of the glass fiber obtained from the glass composition for glass fiber cannot be sufficiently reduced.

The glass composition for glass fiber of the present embodiment has a content of $Al_2O_3$ with respect to the total amount of the glass composition for glass fiber preferably in the range of 8.00 to 13.50% by mass, more preferably in the range of 9.00 to 13.00% by mass, still more preferably in the range of 9.60 to 12.80% by mass, markedly preferably in the range of 10.10 to 12.40% by mass, particularly preferably in the range of 10.30 to 11.90% by mass, especially preferably in the range of 10.50 to 11.50% by mass, and most preferably in the range of 10.60 to 10.90% by mass.

When the glass composition for glass fiber of the present embodiment has a content of $Al_2O_3$ of 13.00% by mass or less with respect to the total amount of the glass composition for glass fiber, the liquid phase temperature is greatly lowered to widen the working temperature range, and thus stable spinning can be conducted.

When the glass composition for glass fiber of the present embodiment has a content of $P_2O_5$ of less than 0.20% by mass with respect to the total amount of the glass composition for glass fiber, it is more likely to difficult to simultaneously achieve reduction in the dielectric loss tangent of the glass fiber obtained from the glass composition for glass fiber and decrease in the 1000 poise temperature of the glass composition for glass fiber. On the other hand, when the content of $P_2O_5$ is more than 4.00% by mass with respect to the total amount of the glass composition for glass fiber, phase separation of the glass fiber obtained from the glass composition for glass fiber cannot be suppressed, and thus the water resistance deteriorates.

The glass composition for glass fiber of the present embodiment has a content of $P_2O_5$ with respect to the total amount of the glass composition for glass fiber preferably in the range of 0.30 to 3.50% by mass, more preferably in the range of 0.50 to 3.20% by mass, still more preferably in the range of 0.70 to 2.90% by mass, particularly preferably in the range of 0.90 to 2.70% by mass, and most preferably in the range of 1.00 to 2.50% by mass.

When the glass composition for glass fiber of the present embodiment has a content of $TiO_2$ with respect to the total amount of the glass composition for glass fiber of less than 0.50% by mass, the viscosity at high temperatures increases. Thus, the temperature at which the glass raw material is melted rises, and from the viewpoint of production cost, the glass composition for glass fiber of the present embodiment will be unsuitable to industrial glass fiber production. On the other hand, when the content of $TiO_2$ with respect to the total amount of the glass composition for glass fiber is more than 5.00% by mass, the dielectric loss tangent of the glass fiber obtained from the glass composition for glass fiber cannot be sufficiently reduced, and the liquid phase temperature of the glass composition for glass fiber greatly increases. Thus, stable manufacturing of glass fiber cannot be conducted.

The glass composition for glass fiber of the present embodiment has a content of $TiO_2$ with respect to the total amount of the glass composition for glass fiber preferably in the range of 0.60 to 4.90% by mass, more preferably in the range of 1.00 to 4.50% by mass, still more preferably in the range of 1.50 to 4.00% by mass, markedly preferably in the range of 1.60 to 3.50% by mass, particularly preferably in the range of 1.70 to 3.40% by mass, especially preferably in the range of 1.80 to 3.30% by mass, and most preferably in the range of 2.10 to 3.20% by mass.

When the glass composition for glass fiber of the present embodiment has a content of CaO of less than 0.10% by mass with respect to the total amount of the glass composition for glass fiber, crystallization of the glass is difficult to suppress, and the liquid phase temperature of the glass composition for glass fiber greatly increases. Thus, the working temperature range cannot be sufficiently ensured. On the other hand, when the content of CaO is more than 5.00% by mass with respect to the total amount of the glass composition for glass fiber, the dielectric loss tangent of the glass fiber obtained from the glass composition for glass fiber cannot be sufficiently reduced.

The glass composition for glass fiber of the present embodiment has a content of CaO with respect to the total amount of the glass composition for glass fiber preferably in the range of 0.50 to 4.50% by mass, more preferably in the range of 0.70 to 4.00% by mass, still more preferably in the range of 0.90 to 3.50% by mass, particularly preferably in the range of 1.10 to 3.00% by mass, especially preferably in the range of 1.30 to 2.70% by mass, and most preferably in the range of 1.50 to 2.50% by mass.

When the glass composition for glass fiber of the present embodiment has a content of MgO of more than 4.00% by mass with respect to the total amount of the glass composition for glass fiber, striae occurs in a melt of the glass composition for glass fiber, and cut of glass fiber during spinning may easily occur.

The glass composition for glass fiber of the present embodiment has a content of MgO with respect to the total amount of the glass composition for glass fiber preferably in the range of less than 3.00% by mass, more preferably in the range of less than 2.00% by mass, still more preferably in the range of less than 1.50% by mass, particularly preferably in the range of less than 1.00% by mass, especially preferably in the range of less than 0.95% by mass, and most preferably in the range of less than 0.50% by mass.

When the glass composition for glass fiber of the present embodiment has a content of $F_2$ and $Cl_2$ in total with respect to the total amount of the glass composition for glass fiber of more than 2.00% by mass, the chemical durability of glass fiber obtained from the glass composition for glass fiber decreases.

The glass composition for glass fiber of the present embodiment has a content of $F_2$ and $Cl_2$ in total with respect to the total amount of the glass composition for glass fiber preferably in the range of 0.10 to 1.80% by mass, more preferably in the range of 0.30 to 1.60% by mass, and still more preferably in the range of 0.50 to 1.50% by mass.

When the glass composition for glass fiber of the present embodiment has a content of $F_2$ and $Cl_2$ of 0.30% by mass or more in total with respect to the total amount of the glass composition for glass fiber, the dielectric constant of the glass fiber obtained from the glass composition for glass fiber can be further reduced.

When the glass composition for glass fiber of the present embodiment has a content of $F_2$ and $Cl_2$ of 1.60% by mass or less in total with respect to the total amount of the glass composition for glass fiber, generation of volatiles derived from $F_2$ and $Cl_2$ can be suppressed on manufacturing glass fiber from the glass composition for glass fiber, and the surrounding environment of the furnace body of a glass melting furnace for melting the glass composition for glass fiber can be prevented from deteriorating.

The glass composition for glass fiber of the present embodiment may include SrO in the range of 0 to 6.00% by mass with respect to the total amount of the glass composition for glass fiber. When the glass composition for glass fiber of the present embodiment includes SrO and the content of SrO is more than 6.00% by mass, the dielectric characteristics of glass fiber obtained from the glass composition for glass fiber deteriorates, and target dielectric characteristics cannot be satisfied.

When the glass composition for glass fiber of the present embodiment includes SrO, the content of SrO with respect to the total amount of the glass composition for glass fiber is preferably in the range of 4.00% by mass or less, more preferably in the range of 3.00% by mass or less, still more preferably in the range of 2.00% by mass or less, particularly preferably in the range of less than 1.00% by mass, especially preferably in the range of less than 0.50% by mass, and most preferably in the range of less than 0.45% by mass.

The glass composition for glass fiber of the present embodiment may include $Na_2O$, $K_2O$, and $Li_2O$ in the range of less than 1.00% by mass in total with respect to the total amount of the glass composition for glass fiber. When the glass composition for glass fiber of the present embodiment includes $Na_2O$, $K_2O$, and $Li_2O$ and the total content of these is more than 1.00% by mass, the dielectric characteristics of the glass fiber obtained from the glass composition for glass fiber greatly deteriorate, and target dielectric characteristics cannot be achieved.

When the glass composition for glass fiber of the present embodiment includes $Na_2O$, $K_2O$, and $Li_2O$, the total content of these with respect to the total amount of the glass composition for glass fiber is preferably in the range of less than 0.80% by mass, more preferably in the range of less than 0.50% by mass, still more preferably in the range of less than 0.20% by mass, particularly preferably in the range of less than 0.10% by mass, and most preferably in the range of less than 0.05% by mass.

The glass composition for glass fiber of the present embodiment may include ZnO in the range of 0 to 3.00% by mass with respect to the total amount of the glass composition for glass fiber. When the glass composition for glass fiber of the present embodiment includes ZnO and the content of ZnO is more than 3.00% by mass, a devitrified product tends to occur during spinning of the glass fiber obtained from the glass composition for glass fiber, stable glass fiber manufacturing cannot be conducted, and the dielectric characteristics of glass fiber deteriorate.

When the glass composition for glass fiber of the present embodiment includes ZnO, the content of ZnO with respect to the total amount of the glass composition for glass fiber is preferably in the range of 2.50% by mass or less, more preferably in the range of 1.50% by mass or less, and still more preferably in the range of 0.50% by mass or less.

The glass composition for glass fiber of the present embodiment may include $MnO_2$ in the range of 0 to 3.00% by mass with respect to the total amount of the glass composition for glass fiber. When the glass composition for glass fiber of the present embodiment includes $MnO_2$ and the content of $MnO_2$ is more than 3.00% by mass, the dielectric characteristics of the glass fiber obtained from the glass composition for glass fiber deteriorate, and desired dielectric characteristics cannot be obtained.

When the glass composition for glass fiber of the present embodiment includes $MnO_2$, the content of $MnO_2$ with respect to the total amount of the glass composition for glass fiber is preferably in the range of 2.50% by mass or less, more preferably in the range of 1.50% by mass or less, and still more preferably in the range of 0.50% by mass or less.

The glass composition for glass fiber of the present embodiment may include $Fe_2O_3$ in the range of 0% by mass or more and 1.00% by mass or less with respect to the total amount of the glass composition for glass fiber. When the glass composition for glass fiber of the present embodiment includes $Fe_2O_3$, it is effective to set the content of $Fe_2O_3$ to 0.10% by mass or more and 0.60% by mass or less from the viewpoint of suppressing the bubble included in the glass fiber.

The glass composition for glass fiber of the present embodiment may include $SnO_2$ in the range of 0% by mass or more and 1.00% by mass or less with respect to the total amount of the glass composition for glass fiber. When the glass composition for glass fiber of the present embodiment includes $SnO_2$, it is effective to set the content of $SnO_2$ to 0.10% by mass or more and 0.60% by mass or less from the viewpoint of suppressing the bubble included in the glass fiber.

The glass composition for glass fiber of the present embodiment may include $ZrO_2$, if within the range of less than 0.50% by mass with respect to the total amount of the glass composition for glass fiber. When the glass composition for glass fiber of the present embodiment includes $ZrO_2$ and the content of $ZrO_2$ is 0.50% by mass or more with respect to the total amount of the glass composition for glass fiber, a devitrified product tends to occur during spinning of the glass fiber obtained from the glass composition for glass fiber, and stable glass fiber manufacturing cannot be conducted.

When the glass composition for glass fiber of the present embodiment includes $ZrO_2$, the content of $ZrO_2$ with respect to the total amount of the glass composition for glass fiber is preferably in the range of less than 0.45% by mass, more preferably in the range of less than 0.40% by mass, still more preferably in the range of less than 0.20% by mass, particularly preferably in the range of less than 0.10% by mass, and most preferably in the range of less than 0.05% by mass.

The glass composition for glass fiber of the present embodiment may include $Cr_2O_3$, if within the range of less than 0.50% by mass with respect to the total amount of the glass composition for glass fiber. When the glass composition for glass fiber of the present embodiment includes $Cr_2O_3$ and the content of $Cr_2O_3$ is 0.05% by mass or more with respect to the total amount of the glass composition for glass fiber, a devitrified product tends to occur during spinning of the glass fiber obtained from the glass composition for glass fiber, and stable glass fiber manufacturing cannot be conducted.

The glass composition for glass fiber of the present embodiment may include, as impurities attributable to raw materials, oxides of Ba, Co, Ni, Cu, Mo, W, Ce, Y, La, Bi, Gd, Pr, Sc, or Yb in the range of less than 1.00% by mass in total with respect to the total amount of the glass composition for glass fiber. Particularly when the glass composition for glass fiber of the present embodiment includes BaO, $CeO_2$, $Y_2O_3$, $La_2O_3$, $Bi_2O_3$, $Gd_2O_3$, $Pr_2O_3$, $Sc_2O_3$, or $Yb_2O_3$ as impurities, the content of each of the impurities is independently preferably in the range of less than 0.40% by mass, more preferably in the range of less than 0.20% by mass, still more preferably in the range of less than 0.10% by mass, particularly preferably less than 0.05% by mass, and most preferably less than 0.01% by mass.

In the glass composition for glass fiber of the present embodiment, the S, A, P, T, C and M preferably satisfy the following formula (1-1), more preferably satisfy the following formula (1-2), still more preferably satisfy the following formula (1-3), particularly preferably satisfy the following formula (2), especially preferably satisfy the following formula (3), and most preferably satisfy the following formula (4):

$$3.86 \leq (S/A)^2 \times (P \times T)^{1/2}/(C+M)^3 \leq 7.32 \quad (1\text{-}1);$$

$$4.00 \leq (S/A)^2 \times (P \times T)^{1/2}/(C+M)^3 \leq 7.32 \quad (1\text{-}2);$$

$$4.25 \leq (S/A)^2 \times (P \times T)^{1/2}/(C+M)^3 \leq 7.32 \quad (1\text{-}3);$$

$$4.51 \leq (S/A)^2 \times (P \times T)^{1/2}/(C+M)^3 \leq 7.32 \quad (2);$$

$$4.87 \leq (S/A)^2 \times (P \times T)^{1/2}/(C+M)^3 \leq 7.20 \quad (3);$$

$$5.96 \leq (S/A)^2 \times (P \times T)^{1/2}/(C+M)^3 \leq 7.16 \quad (4).$$

The glass composition for glass fiber of the present embodiment, by satisfying the formula (2), enables glass fiber having excellent water resistance and extremely excellent dielectric characteristics, that is, a low dielectric constant of 4.0 or less and a low dielectric loss tangent of 0.0010 or less, in a high-frequency region at a measurement frequency of 10 GHz to be obtained therefrom, and per se can have a lowered 1000 poise temperature of less than 1500° C.

The glass composition for glass fiber of the present embodiment, by satisfying the formula (3), enables glass fiber having excellent water resistance and extremely excellent dielectric characteristics, that is, a low dielectric constant of 4.0 or less and a low dielectric loss tangent of 0.0010 or less, in a high-frequency region at a measurement frequency of 10 GHz to be obtained therefrom, and per se can have a lowered 1000 poise temperature of less than 1500° C. and excellent glass fiber manufacturability with a working temperature range of 150° C. or more.

The glass composition for glass fiber of the present embodiment, by satisfying the formula (4), enables glass fiber having excellent water resistance and extremely excellent dielectric characteristics, that is, a low dielectric constant of 4.0 or less and a low dielectric loss tangent of 0.0010 or less, in a high-frequency region at a measurement frequency of 10 GHz to be obtained therefrom, and per se can have a lowered 1000 poise temperature of less than 1500° C. and extremely excellent glass fiber manufacturability with a working temperature range of 200° C. or more.

Regarding the content of each component described above in the glass composition for glass fiber of the present embodiment, the content of Li as the light element can be measured with an ICP emission spectroscopic analyzer, and the contents of the other elements can be measured with a wavelength dispersive X-ray fluorescence analyzer.

The measurement method is as follows. First, a glass batch prepared by mixing a glass raw material is placed in a platinum crucible and in an electric furnace, melted with stirring while being held at a temperature of 1550° C. for 4 hours and then additionally at a temperature of 1650° C. for 2 hours to obtain a homogeneous molten glass. Alternatively, glass fiber is placed in a platinum crucible and melted with stirring while being held at a temperature of 1550° C. for 6 hours in an electric furnace to obtain a homogeneous molten glass.

When organic matter adheres to the surface of the glass fiber, or when glass fiber is mainly included as a reinforcing material in organic matter (resin), the glass fiber is used after the organic matter is removed by, for example, heating for about 0.5 to 24 hours in a muffle furnace at a temperature of 300 to 650° C.

Next, the obtained molten glass is poured onto a carbon plate to produce a glass cullet, and then pulverized and powdered into glass powder. Regarding Li as a light element, the resulting glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. For the quantitative analysis using a wavelength dispersive X-ray fluorescence analyzer, specifically, specimens for calibration curve are prepared based on the measurement results from the fundamental parameter method, and the analysis can be performed by the calibration curve method. The content of each component in the specimens for calibration curve can be quantitatively analyzed by an ICP emission spectroscopic analyzer. These quantitative analysis results are converted in terms of oxides to calculate the content of each component and the total amount, and the above content of each component can be determined from these numerical values.

The glass composition for glass fiber of the present embodiment can be obtained by melting a glass raw material prepared to have the above composition after melt-solidification (glass batch) and then cooling to be solidified.

When the glass fiber of the present embodiment is formed from the glass composition for glass fiber of the present embodiment, at first, the glass raw material prepared as described above is supplied to a glass melting furnace, and is melted at a temperature range of 1000 poise temperature or more, specifically, a temperature range of 1400 to 1700° C. The molten glass melted at the above temperature is then discharged from 1 to 8000 nozzle tips or holes controlled at a predetermined temperature and cooled while stretched by winding at high speed to be solidified into glass fiber.

Glass single fiber (glass filament) discharged from one nozzle tip or hole, cooled and solidified typically has a perfect circle cross-sectional shape and has a diameter in the range of 3.0 to 35.0 μm. In applications that require low dielectric properties, the glass filament preferably has a diameter in the range of 3.0 to 6.0 μm and more preferably a diameter in the range of 3.0 to 4.5 μm.

On the other hand, when the above nozzle tip has a non-circular shape and has a protrusion or a notch for rapidly cooling the molten glass, controlling the temperature condition can provide a glass filament having a non-circular (for example, elliptical and long-oval) cross-sectional shape. When the glass filament has an elliptical or long-oval cross-sectional shape, the ratio of the major axis to the minor axis of the cross-sectional shape (major axis/minor axis) is, for example, in the range of 2.0 to 10.0 and the fiber diameter (converted fiber diameter) when the cross-sectional area is converted to a perfect circle is in the range of 3.0 to 35.0 μm.

The glass fiber of the present embodiment typically has a shape of a glass fiber bundle (glass strand) in which the above glass filaments in the range of 10 to 8000 filaments are bundled, and has a weight in the range of 1 to 10000 tex (g/km). Glass filaments discharged from a plurality of nozzle tips or holes may be bundled into one glass fiber bundle or may be bundled into a plurality of glass fiber bundles.

The glass fiber of the present embodiment can have various forms, which are obtained by further processing the above glass strands, such as yarns, woven fabrics, knitted fabrics, non-woven fabrics (including chopped strand mats and multiaxial non-woven fabrics), chopped strands, rovings, and powders.

The glass fiber of the present embodiment may be coated with an organic matter on the surface thereof for the purposes such as improvement of glass filament convergence, improvement of adhesiveness between glass fiber and a resin, and improvement of uniform dispersibility of glass fiber in a mixture of glass fiber and resin or inorganic material. Examples of such an organic matter can include starch, urethane resins, epoxy resins, vinyl acetate resins, acrylic resins, modified polypropylene (particularly carboxylic acid-modified polypropylene), and a copolymer of (poly)carboxylic acid (particularly maleic acid) and an unsaturated monomer.

The glass fiber of the present embodiment may be coated with the resin composition including a silane coupling agent, a lubricant, surfactant, and the like in addition to these resins. The glass fiber of the present embodiment may be coated with the treating agent composition not including the above resins and including a silane coupling agent, surfactant, and the like. Such a resin composition or treating agent composition covers the glass fiber at a rate in the range of 0.03 to 2.0% by mass based on the mass of the glass fiber of the present embodiment in a state where it is not coated with the resin composition or the treating agent composition.

The glass fiber can be coated with an organic matter by applying a resin solution or a resin composition solution to the glass fiber using a known method such as a roller applicator, for example, in the manufacturing process of the glass fiber and then drying the glass fiber to which the resin solution or the resin composition solution is applied. The glass fiber can be coated with an organic matter also by immersing the glass fiber of the present embodiment in the form of a woven fabric in the treating agent composition solution and then drying the glass fiber to which the treating agent composition is applied.

Here, examples of the silane coupling agent include aminosilanes, chlorosilanes, mercaptosilanes, vinylsilanes, and (meth)acrylsilanes Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane Examples of the chlorosilane include γ-chloropropyltrimethoxysilane.

Examples of the epoxysilane include (β-(3,4-epoxycyclohexyl)ethyltrimethoxysilane and γ-glycidoxypropyltrimethoxysilane.

Examples of the mercaptosilane can include γ-mercaptotrimethoxysilane.

Examples of the vinylsilane include vinyl trimethoxysilane and N-β-(N-vinylbenzylaminoethyl)-γ-aminopropyltrimethoxysilane Examples of the (meth)acrylsilane include γ-methacryloxypropyltrimethoxysilane In the present embodiment, the silane coupling agents may be used singly or in combination of two or more.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of a polyethylenepolyamine such as diethylenetriamine, triethylenetetramine, or tetraethylenepentamine and a fatty acid such as lauric acid, myristic acid, palmitic acid, or stearic acid.

Examples of the quaternary ammonium salt include alkyltrimethylammonium salts such as lauryltrimethylammonium chloride.

In the present embodiment, the lubricants may be used singly or in combination of two or more.

Examples of the surfactant can include nonionic surfactants, cationic surfactants, anionic surfactants, and amphoteric surfactants. In the present embodiment, the surfactants may be used singly or in combination of two or more.

Examples of the nonionic surfactant can include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant can include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant can include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoteric surfactant can include amino acid amphoteric surfactants such as alkali metal salts of alkylaminopropionic acid, betaine amphoteric surfactants such as alkyldimethylbetaine, and imidazoline amphoteric surfactants.

The glass fiber woven fabric of the present embodiment includes the above glass fiber of the present embodiment. Specifically, the glass fiber woven fabric of the present embodiment can be obtained by weaving the above glass fiber of the present embodiment as at least a part of warp yarns or weft yarns with a loom known per se. Examples of the loom may include jet looms such as air jet or water jet looms, shuttle looms, and rapier looms.

Examples of weaving with the loom may include plain weaving, satin weaving, mat weaving, and twill weaving. From the viewpoint of production efficiency, plain weaving is preferred. In the glass fiber woven fabric of the present embodiment, the above glass fiber of the present embodiment is preferably used as warp yarns and weft yarns.

In the glass fiber woven fabric of the present embodiment, the above glass fiber of the present embodiment is preferably formed by bundling glass filaments in the range of 35 to 400 filaments, each having a diameter in the range of 3.0 to 9.0 μm, has a number of twists in the range of 0 to 1.0 twist/25 mm, and has a mass in the range of 0.9 to 69.0 tex (g/km).

In the glass fiber woven fabric of the present embodiment, when the above glass fiber of the present embodiment is employed as warp yarns or weft yarns, the warp yarn weaving density is preferably in the range of 40 to 120 yarns/25 mm, and the weft yarn weaving density is preferably in the range of 40 to 120 yarns/25 mm.

The glass fiber woven fabric of the present embodiment, after woven, may be subjected to desizing treatment, surface treatment, and opening treatment.

An example of the desizing treatment can be a treatment including placing the glass fiber woven fabric in a heating oven having an atmosphere temperature in the range of 350° C. to 400° C. for a time period in the range of 40 to 80 hours to thereby pyrolytically decompose organic matter adhering to the glass fiber.

An example of the surface treatment can be a treatment including immersing the glass fiber woven fabric in a solution including the silane coupling agent or including the silane coupling agent and the surfactant, squeezing extra water therefrom, and heat-drying the woven fabric at a temperature in the range of 80 to 180° C. for a time period in the range of 1 to 30 minutes.

An example of the opening treatment is a treatment in which the warp yarns of the glass fiber woven fabric are subjected to opening by means of water flow pressure, opening by means of high-frequency vibration using a liquid as a medium, opening by means of the pressure of a fluid having a surface pressure, opening by means of pressing with a roll, or the like under a tension in the range of 30 to 200 N to thereby widen the width of the warp yarns and weft yarns.

The glass fiber woven fabric of the present embodiment has a mass per unit area in the range of 7.0 to 190.0 g/m2 and preferably has a thickness in the range of 8.0 to 200.0 μm.

The yarn width of the warp yarns of the glass fiber woven fabric of the present embodiment is preferably in the range of 110 to 600 μm and the yarn width of the weft yarns thereof is preferably in the range of 110 to 600 μm.

The glass fiber woven fabric of the present embodiment may comprise a surface treatment layer including the silane coupling agent or the silane coupling agent and the surfactant. When the glass fiber woven fabric of the present embodiment includes the surface treatment layer, the surface treatment layer can have a mass in the range of 0.03 to 1.50% by mass, for example, with respect to the total amount of the glass fiber woven fabric including the surface treatment layer.

The glass fiber-reinforced resin composition of the present embodiment includes the above glass fiber of the present embodiment. Specifically, the glass fiber-reinforced resin composition of the present embodiment includes in the range of 10 to 90% by mass of glass fiber with respect to the total amount of the glass fiber-reinforced resin composition, as the glass fiber-reinforced resin composition including thermoplastic resin or thermosetting resin, glass fiber, and other additives. The glass fiber-reinforced resin composition of the present embodiment includes a resin in the range of 90 to 10% by mass and includes other additives in the range of 0 to 40% by mass with respect to the total amount of the glass fiber-reinforced resin composition.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PIT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (JO) resins, polybutadiene, styrene/butadiene resins, polybutylene, polymethylpentene, olefin/vinyl alcohol resins, cyclic olefin resins, cellulose resins, and polylactic acid.

Specific examples of the polyethylene can include high density polyethylene (HDPE), medium density polyethylene, low density polyethylene (LDPE), linear low density polyethylene (LLDPE), and ultra high molecular weight polyethylene.

Examples of the polypropylene can include isotactic polypropylene, atactic polypropylene, syndiotactic polypropylene, and mixtures thereof.

Examples of the polystyrene can include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin can include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride can include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 61), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 41), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14) or copolymers or mixtures of two or more of the components.

Examples of the polyacetal can include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate can include a polymer obtained by polycondensation of terephthalic acid or a derivative thereof with ethylene glycol.

Examples of the polybutylene terephthalate can include a polymer obtained by polycondensation of terephthalic acid or a derivative thereof with 1,4-butanediol.

Examples of the polytrimethylene terephthalate can include polymers obtained by polycondensation of terephthalic acid or a derivative thereof with 1,3-propanediol.

Examples of the polycarbonate can include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide can include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the polyphenylene ether can include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly[2(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Examples of the modified polyphenylene ether can include: a polymer alloy of poly(2,6-dimethyl-1,4-phenylene)ether and polystyrene; a polymer alloy of poly(2,6-dimethyl-1,4-phenylene)ether and a styrene/butadiene copolymer; a polymer alloy of poly(2,6-dimethyl-1,4-phenylene) ether and a styrene/maleic anhydride copolymer; a polymer alloy of poly(2,6-dimethyl-1,4-phenylene)ether and polyamide; a polymer alloy of poly(2,6-dimethyl-1,4-phenylene) ether and styrene/butadiene/acrylonitrile copolymer; one obtained by introducing a functional group such as an amino group, an epoxy group, a carboxy group, a styryl group, or the like at the polymer chain end of the polyphenylene ether; and one obtained by introducing a functional group such as an amino group, an epoxy group, a carboxy group, a styryl group, a methacryl group, or the like at the polymer chain side chain of the polyphenylene ether.

Examples of the polyaryl etherketone can include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) consisting of one or more structural units selected from the group consisting of aromatic hydroxycarbonyl units which are thermotropic liquid crystal polyesters, aromatic dihydroxy units, aromatic dicarbonyl units, aliphatic dihydroxy units, aliphatic dicarbonyl units, and the like.

Examples of the fluororesin can include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin can include copolymers of an olefin or a styrene and an unsaturated carboxylic acid, wherein a part of carboxyl groups is neutralized with a metal ion.

Examples of the olefin/vinyl alcohol resin can include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin can include monocyclic compounds such as cyclohexene, polycyclic compounds such as tetracyclopentadiene, and polymers of cyclic olefin monomers.

Examples of the polylactic acid can include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, polyimide (PI), urea (UF) resins, silicone (SI) resins, furan (FR) resins, benzoguanamine (BR) resins, alkyd resins, xylene resins, bismaleimide triazine (BT) resins, and diallyl phthalate resin (PDAP).

Specific examples of the unsaturated polyester resin can include resin which can be obtained by esterification reaction of aliphatic unsaturated dicarboxylic acid and aliphatic diol.

Examples of the vinyl ester resin can include bis vinyl ester resins and novolac vinyl ester resins.

Examples of the epoxy resin can include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexylidne bisphenol epoxy resins), phenol novolac epoxy resins, cresol novolac epoxy resins, tetraphenol group ethane novolac type epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins.

Examples of the melamine resin can include a polymer formed by polycondensation of melamine (2,4,6-triamino-1,3,5-triazine) and formaldehyde.

Examples of the phenolic resin can include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the urea resin can include a resin obtained by condensation of urea and formaldehyde.

The above thermoplastic resin or the above thermosetting resin may be used singly or in combinations of two or more.

The glass fiber-reinforced resin composition of the present embodiment is used in applications that require low dielectric properties. Thus, as the resin, preferred are epoxy resins, modified polyphenylene ethers, polybutylene terephthalate, polypropylene, fluorine resins, and liquid crystal polymer (LCP).

Examples of the above other additives can include reinforcing fiber other than glass fiber, a filler other than glass fiber, a flame retardant, an UV absorber, a heat stabilizer, an antioxidant, an antistatic agent, a fluidity improver, an anti-blocking agent, a lubricant, a nucleating agent, an antibacterial agent, and pigment.

Examples of the reinforcing fiber other than glass fiber include carbon fiber and metal fiber.

Examples of the filler other than glass fiber include glass powder, talc, and mica.

The glass fiber-reinforced resin composition of the present embodiment may be prepreg obtained by impregnating the glass fiber woven fabric of the present embodiment with the resin by a known method per se and semi-curing the woven fabric.

The glass fiber-reinforced resin composition of the present embodiment can be molded by known molding methods such as injection molding method, injection compression molding method, two-color molding method, hollow molding method, foam molding method (including supercritical fluid), insert molding method, in-mold coating molding method, extrusion molding method, sheet molding method, thermoforming method, rotational molding method, laminate molding method, press molding method, blow molding method, stamping molding method, infusion method, hand lay-up method, spray-up method, resin transfer molding method, sheet molding compound method, bulk molding compound method, pultrusion method, and filament winding method to obtain various glass fiber-reinforced resin molded products. Curing the prepreg can also provide glass fiber-reinforced resin molded products.

Examples of applications of such molded products can include electronic device housing, electronic components, vehicle exterior members, vehicle interior members, vehicle engine members, muffler members, and high pressure tanks.

Examples of the electronic components include printed wiring boards.

Examples of the vehicle exterior members include bumpers, fenders, bonnets, air dams, and wheel covers.

Examples of the vehicle interior members include door trims and ceiling materials.

Examples of the vehicle engine members include oil pans, engine covers, intake manifolds, and exhaust manifolds.

Examples of the muffler members include silencers.

The glass fiber of the present embodiment can be suitably used as a reinforcing material for inorganic materials such as gypsum and cement, in addition to the glass fiber-reinforced resin composition of the present embodiment. For example, when used as a reinforcing material for gypsum, especially, gypsum board having a thickness in the range of 4 to 60 mm, the glass fiber comprising the glass composition in the above range can be included in a range of 0.1 to 4.0% by mass with respect to the total mass of gypsum.

Examples and Comparative Examples of the present invention will be shown.

EXAMPLES

At first, glass raw material was mixed to obtain a glass batch so that the glass composition after melt-solidification was the composition of Examples 1 to 8 shown in Table 1 or Comparative Examples 1 to 5 shown in Table 2.

Next, the glass batch corresponding to the glass composition for glass fiber of Examples 1 to 8 or Comparative Examples 1 to 5 was placed in an 80 mm diameter platinum crucible, melted by heating at a temperature of 1550° C. for 4 hours and then further heating at a temperature of 1650° C. for 2 hours, and taken out of the crucible to obtain homogeneous glass bulk or glass cullet. The obtained glass bulk or glass cullet was then annealed at a temperature of 620° C. for 8 hours to obtain a test piece.

The dielectric constant and dielectric loss tangent of the obtained test piece were evaluated by the following methods. Additionally, the glass cullet obtained in the process of forming the test piece was used to evaluate the water resistance by the following method. The 1000 poise temperature and liquid phase temperature were measured using the glass cullet obtained in the process of forming the test piece, and the working temperature range was calculated from these values. The results are shown in Table 1 and Table 2.

Evaluation Method of Water Resistance

The glass cullet obtained as mentioned above was placed in a small cylindrical platinum bushing having a circular nozzle tip at the bottom thereof, and the bushing was heated to a predetermined temperature to melt the glass cullet. Then, the molten glass discharged through the nozzle tip was cooled and solidified while stretched by winding on a stainless collet at a predetermined speed to thereby obtain glass fiber comprising a perfect circular section and a fiber diameter of 13 μm. About 1 g of the obtained glass fiber (glass fiber for test) was collected from the collet and dried at a temperature of 120° C. for an hour, and the mass (mass before operation) was measured. Then, the glass fiber for test was allowed to stand in distilled water of 100 ml at a temperature of 80° C. for 24 hours. Thereafter, the glass fiber for test was taken on metal mesh perforated with eyes of about 150 μm, washed with distilled water, and then dried at a temperature of 120° C. for an hour, and the mass (mass after operation) was measured.

The mass reduction rate (100×(1−(mass after operation/mass before operation))) was calculated from the mass before operation and mass after operation. Glass fiber of which the mass reduction rate was 2.0% or less and of which the components were not substantially eluted even in water was considered OK, and glass fiber of which the mass reduction rate was more than 2.0% and of which the components were greatly eluted in water was considered No Good.

Measurement Method of Dielectric Constant and Dielectric Loss Tangent

The test piece was polished to prepare an 80 mm×3 mm (1 mm thickness) polished test piece. Then, the obtained polished test piece was completely dried and then stored in a room at a temperature of 23° C. and a humidity of 60% for 24 hours. Subsequently, for each of the obtained polished test pieces, according to JIS C 2565: 1992, the dielectric constant (dielectric constant Dk) and dielectric loss tangent (dissipation factor Df) at 10 GHz were measured using a cavity resonator method dielectric constant measuring apparatus (manufactured by AET, Inc., trade name: ADMS01Oc1).

Measurement Method of 1000 Poise Temperature

The glass cullet was melted in a platinum crucible using a high temperature electric furnace equipped with a rotational viscometer (manufactured by Shibaura Systems Co., Ltd.), and the viscosity of the molten glass was continuously measured using a Brookfield rotational viscometer while the melt temperature was varied. The temperature at which the rotational viscosity was 1000 poise was measured to determine the 1000 poise temperature.

Measurement Method of Liquid Phase Temperature

The glass cullet was pulverized, 40 g of glass particles having a particle diameter in the range of 0.5 to 1.5 mm was placed in a platinum boat of 180 mm×20 mm×15 mm and heated in a tubular electric furnace provided with a temperature gradient in the range of 1000 to 1550° C. for 8 hours or more, then taken out of the tubular electric furnace, and observed with a polarized light microscope to identify the point at which crystals derived from glass (devitrification) began to precipitate. The temperature inside the tubular electric furnace was actually measured using a type B thermocouple to determine the temperature of the point at which the crystals began to precipitate, which temperature was taken as the liquid phase temperature.

Calculation Method of Working Temperature Range

From the difference between the 1000 poise temperature and the liquid phase temperature, the working temperature range was calculated.

TABLE 1

| | Example 1 | Example 2 | Example 3 | Example 4 | Example 5 | Example 6 | Example 7 | Example 8 |
|---|---|---|---|---|---|---|---|---|
| $SiO_2$(% by mass; S) | 58.90 | 56.30 | 56.20 | 57.30 | 56.90 | 56.60 | 56.40 | 56.90 |
| $B_2O_3$(% by mass) | 22.20 | 22.80 | 22.90 | 22.50 | 22.90 | 22.80 | 22.90 | 22.90 |
| $Al_2O_3$(% by mass; A) | 10.80 | 12.00 | 12.00 | 11.90 | 12.00 | 11.40 | 12.00 | 12.00 |
| $P_2O_5$(% by mass; P) | 2.10 | 2.10 | 3.60 | 2.20 | 1.60 | 2.10 | 1.00 | 1.60 |
| $TiO_2$(% by mass; T) | 3.10 | 3.10 | 1.60 | 3.20 | 3.10 | 3.60 | 4.20 | 2.60 |
| CaO(% by mass; C) | 2.20 | 2.20 | 2.20 | 2.20 | 2.20 | 2.60 | 2.20 | 2.20 |
| MgO(% by mass; M) | 0 | 0 | 0 | 0 | 0 | 0 | 0 | 0 |
| $F_2$(% by mass) | 0.70 | 1.50 | 1.50 | 0.70 | 1.30 | 0.90 | 1.30 | 1.30 |
| $Cl_2$(% by mass) | 0 | 0 | 0 | 0 | 0 | 0 | 0 | 0 |
| $F_2 + Cl_2$(% by mass) | 0.70 | 1.50 | 1.50 | 0.70 | 1.30 | 0.90 | 1.30 | 1.30 |
| $Na_2O + K_2O + Li_2O$ | 0 | 0 | 0 | 0 | 0 | 0 | 0 | 0 |
| SrO(% by mass) | 0 | 0 | 0 | 0 | 0 | 0 | 0 | 0 |
| $MnO_2$(% by mass) | 0 | 0 | 0 | 0 | 0 | 0 | 0 | 0.50 |
| $ZrO_2$(% by mass) | 0 | 0 | 0 | 0 | 0 | 0 | 0 | 0.0 |
| Total | 100.00 | 100.00 | 100.00 | 100.00 | 100.00 | 100.00 | 100.00 | 100.00 |
| $(S/A)^2 \times (P \times T)^{(1/2)}/(C + M)^3$ | 7.13 | 5.27 | 4.94 | 5.78 | 4.70 | 3.86 | 4.25 | 4.31 |
| Water resistance | OK | OK | OK | OK | OK | OK | OK | OK |
| 1000 poise temperature (° C.) | 1463 | 1424 | 1446 | 1449 | 1416 | 1436 | 1395 | 1414 |
| Liquid phase temperature (° C.) | 1208 | 1270 | 1275 | 1270 | 1300 | 1289 | 1332 | 1292 |
| Working temperature range (° C.) | 255 | 154 | 171 | 179 | 116 | 147 | 63 | 122 |
| Dielectric constant | 4.0 | 4.0 | 4.0 | 4.0 | 4.0 | 4.1 | 4.1 | 4.1 |
| Dielectric loss tangent | 0.0010 | 0.0010 | 0.0010 | 0.0010 | 0.0010 | 0.0011 | 0.0011 | 0.0011 |

TABLE 2

| | Comparative Example 1 | Comparative Example 2 | Comparative Example 3 | Comparative Example 4 | Comparative Example 5 |
|---|---|---|---|---|---|
| $SiO_2$(% by mass; S) | 60.10 | 55.30 | 52.50 | 59.60 | 62.20 |
| $B_2O_3$(% by mass) | 22.30 | 22.90 | 26.20 | 20.20 | 22.30 |
| $Al_2O_3$(% by mass; A) | 8.40 | 13.00 | 12.10 | 11.60 | 8.30 |
| $P_2O_5$(% by mass; P) | 2.00 | 1.00 | 3.40 | 0.30 | 0 |
| $TiO_2$(% by mass; T) | 2.90 | 4.20 | 3.40 | 4.10 | 3.10 |
| CaO(% by mass; C) | 3.30 | 2.30 | 1.90 | 3.70 | 3.10 |
| MgO(% by mass; M) | 0 | 0 | 0 | 0 | 0 |
| $F_2$(% by mass) | 1.00 | 1.30 | 0.50 | 0.50 | 1.00 |
| $Cl_2$(% by mass) | 0 | 0 | 0 | 0 | 0 |
| $F_2 + Cl_2$(% by mass) | 1.00 | 1.30 | 0.50 | 0.50 | 1.00 |
| $Na_2O + K_2O + Li_2O$ | 0 | 0 | 0 | 0 | 0 |
| SrO(% by mass) | 0 | 0 | 0 | 0 | 0 |
| $MnO_2$(% by mass) | 0 | 0 | 0 | 0 | 0 |
| $ZrO_2$(% by mass) | 0 | 0 | 0 | 0 | 0 |
| Total | 100.00 | 100.00 | 100.00 | 100.00 | 100.00 |
| $(S/A)^2 \times (P \times T)^{(1/2)}/(C + M)^3$ | 3.43 | 3.05 | 9.33 | 0.58 | 0.00 |
| Water resistance | OK | OK | NG | OK | OK |
| 1000 poise temperature (° C.) | 1507 | 1376 | 1414 | 1443 | 1504 |
| Liquid phase temperature (° C.) | 1100 | 1334 | 1239 | 1215 | 1120 |
| Working temperature range (° C.) | 407 | 42 | 175 | 228 | 384 |
| Dielectric constant | 4.0 | 4.2 | 4.0 | 4.1 | 4.0 |
| Dielectric loss tangent | 0.0010 | 0.0011 | 0.0010 | 0.0012 | 0.0009 |

As can be seen from Table 1, according to the glass compositions for glass fiber of Examples 1 to 8, which include $SiO_2$ in the range of 50.00 to 61.00% by mass, $B_2O_3$ in the range of 16.00 to 27.00% by mass, $Al_2O_3$ in the range of 7.00 to 14.00% by mass, $P_2O_5$ in the range of 0.20 to 4.00% by mass, $TiO_2$ in the range of 0.50 to 5.00% by mass, CaO in the range of 0.10 to 5.00% by mass, MgO in the range of 0 to 4.00% by mass, and $F_2$ and $Cl_2$ in the range of 0 to 2.00% by mass in total, with respect to the total amount of the glass composition for glass fiber and in which the content S (% by mass) of $SiO_2$, the content A (% by mass) of $Al_2O_3$, the content P (% by mass) of $P_2O_5$, the content T (% by mass) of $TiO_2$, the content C (% by mass) of CaO, and the content M (% by mass) of MgO satisfy the formula (1), glass fiber having excellent water resistance and excellent dielectric characteristics, that is, a dielectric constant of 4.1 or less and a dielectric loss tangent of 0.0011 or less, in a high-frequency region at a measurement frequency of 10 GHz can be obtained, and the 1000 poise temperature thereof can be lowered to less than 1500° C.

In contrast, as can be seen from Table 2, according to the glass composition for glass fiber of Comparative Examples 1, 2, and 4, although including $SiO_2$ in the range of 50.00 to 61.00% by mass, $B_2O_3$ in the range of 16.00 to 27.00% by mass, $Al_2O_3$ in the range of 7.00 to 14.00% by mass, $P_2O_5$ in the range of 0.20 to 4.00% by mass, $TiO_2$ in the range of 0.50 to 5.00% by mass, CaO in the range of 0.10 to 5.00% by mass, MgO in the range of 0 to 4.00% by mass, and $F_2$ and $Cl_2$ in the range of 0 to 2.00% by mass in total, with respect to the total amount of the glass composition for glass fiber, in which the S, A, P, T, C and M are less than the range of the formula (1), the 1000 poise temperature thereof is more than 1500° C., or the obtained glass fiber has a dielectric constant of more than 4.1 or a dielectric loss tangent of more than 0.0011, and according to the glass composition for glass fiber of Comparative Example 3, in which the S, A, P, T, C, and M exceeds the range of the formula (1), sufficient water resistance cannot be achieved.

Further, according to the glass composition for glass fiber of Comparative Example 5, which includes $SiO_2$ of more than 61.00% by mass with respect to the total amount of the glass composition for glass fiber and in which the content of $P_2O_5$ is less than 0.20% by mass and the S, A, P, T, C, and M are less than the range of the formula (1), it is clear that the 1000 poise temperature thereof is more than 1500° C.

The invention claimed is:

1. A glass composition for glass fiber comprising:
$SiO_2$ in a range of 50.00 to 61.00% by mass,
$B_2O_3$ in a range of 16.00 to 27.00% by mass,
$Al_2O_3$ in a range of 7.00 to 14.00% by mass,
$P_2O_5$ in a range of 0.20 to 2.90% by mass,
$TiO_2$ in a range of 0.50 to 5.00% by mass,
CaO in a range of 0.10 to 5.00% by mass,
MgO in a range of 0 to 4.00% by mass, and
$F_2$ and $Cl_2$ in a range of 0 to 2.00% by mass in total, with respect to the total amount of the glass composition for glass fiber, wherein
a content S (% by mass) of $SiO_2$, a content A (% by mass) of $Al_2O_3$, a content P (% by mass) of $P_2O_5$, a content T (% by mass) of $TiO_2$, a content C (% by mass) of CaO, and a content M (% by mass) of MgO satisfy following formula (1):

$$3.65 \leq (S/A)^2 \times (P \times T)^{1/2} / (C+M)^3 \leq 8.25 \quad (1).$$

2. The glass composition for glass fiber according to claim 1, wherein the S, A, P, T, C, and M satisfy following formula (2):

$$4.51 \leq (S/A)^2 \times (P \times T)^{1/2} / (C+M)^3 \leq 7.32 \quad (2).$$

3. The glass composition for glass fiber according to claim 1, wherein the S, A, P, T, C, and M satisfy following formula (3):

$$4.87 \leq (S/A)^2 \times (P \times T)^{1/2} / (C+M)^3 \leq 7.20 \quad (3).$$

4. The glass composition for glass fiber according to claim 1, wherein the S, A, P, T, C, and M satisfy following formula (4):

$$5.96 \leq (S/A)^2 \times (P \times T)^{1/2} / (C+M)^3 \leq 7.16 \quad (4).$$

5. A glass composition for glass fiber comprising:
$SiO_2$ in a range of 50.00 to 61.00% by mass,
$B_2O_3$ in a range of 16.00 to 27.00% by mass,
$Al_2O_3$ in a range of 7.00 to 14.00% by mass,
$P_2O_5$ in a range of 0.20 to 4.00% by mass,
$TiO_2$ in a range of 0.50 to 5.00% by mass,
CaO in a range of 0.10 to 5.00% by mass,
MgO in a range of 0 to 4.00% by mass, and
$F_2$ and $Cl_2$ in a range of 0 to 2.00% by mass in total, with respect to the total amount of the glass composition for glass fiber, wherein
a content S (% by mass) of $SiO_2$, a content A (% by mass) of $Al_2O_3$, a content P (% by mass) of $P_2O_5$, a content T (% by mass) of $TiO_2$, a content C (% by mass) of CaO, and a content M (% by mass) of MgO satisfy following formula (4):

$$5.96 \leq (S/A)^2 \times (P \times T)^{1/2} / (C+M)^3 \leq 7.16 \quad (4).$$

6. Glass fiber formed from the glass composition for glass fiber according to claim 1.

7. A glass fiber woven fabric comprising the glass fiber according to claim 6.

8. A glass fiber-reinforced resin composition comprising the glass fiber according to claim 6.

* * * * *